Sept. 19, 1950    F. A. QUIROZ    2,522,800
APPARATUS FOR EXTRACTING JUICE FROM
CITRUS FRUITS AND THE LIKE
Filed Nov. 17, 1945    2 Sheets-Sheet 2
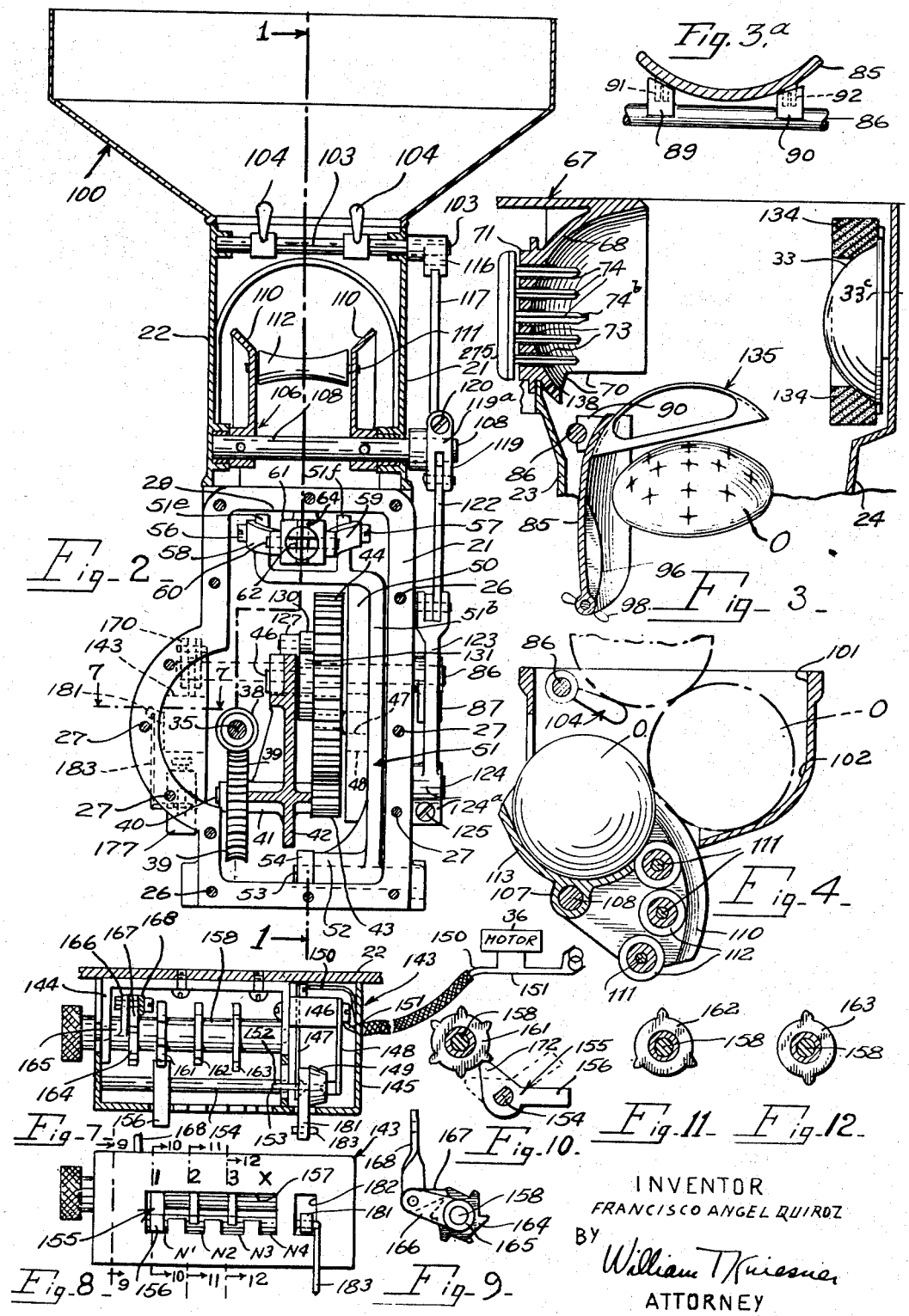
INVENTOR
FRANCISCO ANGEL QUIROZ
BY William T. Kiesner
ATTORNEY Patented Sept. 19, 1950

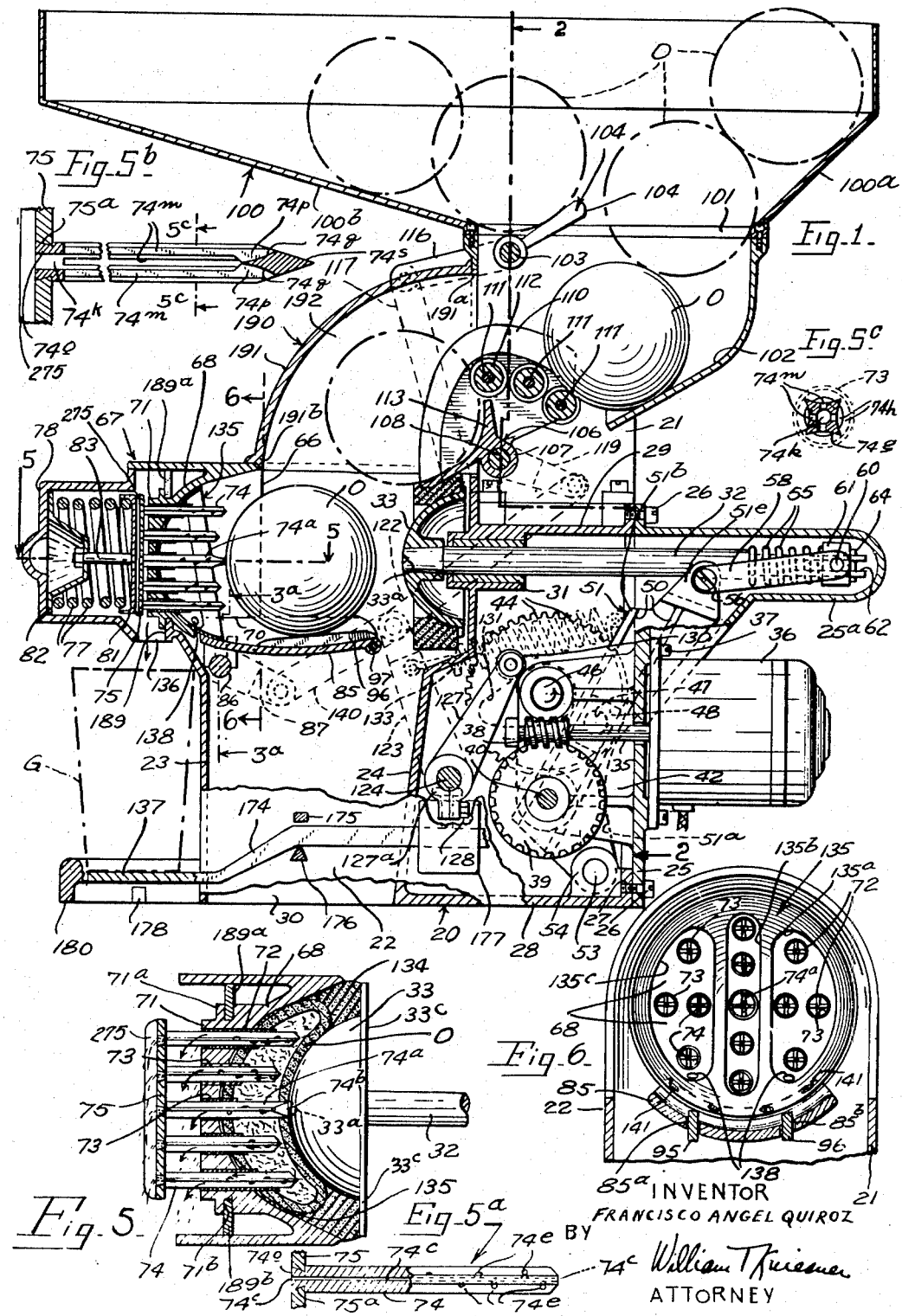

2,522,800

UNITED STATES PATENT OFFICE 2,522,800

APPARATUS FOR EXTRACTING JUICE FROM CITRUS FRUITS AND THE LIKE

Francisco Angel Quiroz, Newark, N. J.

Application November 17, 1945, Serial No. 629,211

26 Claims. (Cl. 100—50)

This invention relates to apparatus for extracting juices from fruits such as citrus fruits like oranges, lemons, grapefruit, and the like.

One of the objects of this invention is to provide a practical, compact, and dependable apparatus for efficiently handling and operating upon fruit, of which an orange is a good illustration, to effect separation or extraction of the juices from the remaining parts of the fruit and to effect dependable handling and disposition of the remnant or remnants of the fruit. Another object is to provide an apparatus of the just-mentioned kind that will be sanitary in its operation upon and handling of the fruit and its products and that can be easily and effectively kept clean. Another object is to provide an apparatus of the above-mentioned character in which the operations may be selectively carried on upon a single fruit or upon a continuous succession thereof or upon any desired or selectable quantity thereof. Another object is to provide an apparatus of the above-mentioned character for juice extraction in which material contamination of the fruit juice by ingredients, such as certain oils contained illustratively in the skin of the orange, may be dependably avoided. Another object is to provide an apparatus for efficient juice extraction in which rupture or distortion of the skin, such as the skin of an orange, is dependably and reliably controlled so as to effect material lessening of the possibility of forcing undesirable oil or other ingredients out of the skin. Another object is to provide an apparatus for juice extraction in which dependable segregation between extracted fruit juice and any possible liquid or other undesirable skin ingredients may be effected in a simple, practical, and dependable manner. Another object is in general to provide an improved apparatus for extracting juice from fruits, and other objects will be in part obvious or in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

In the accompanying drawings, in which is shown a preferred and illustrative embodiment of the mechanical features of my invention, Fig. 1 is a central longitudinal vertical sectional view of the complete apparatus, more particularly as seen along the line 1—1 of Fig. 2;

Fig. 2 is an end elevation as seen from the right in Fig. 1, with certain parts removed or omitted in order to show other parts more clearly, more particularly as seen along the line 2—2 of Fig. 1;

Fig. 3 is a central vertical sectional view showing certain of the parts of Fig. 1 in certain relative positions in an ejecting stage of the apparatus;

Fig. 3ª is a fragmentary sectional view as seen along the line 3ª—3ª of Fig. 1 showing a form of mounting of a supporting and ejecting structure relative to its operating shaft;

Fig. 4 shows certain of the fruit-injecting mechanism of Fig. 1 in relative positions corresponding to a subsequent stage of actuation of the apparatus;

Fig. 5 is a detached or fragmentary sectional view on a larger scale and as seen along the line 5—5 of Fig. 1, showing certain of the mechanism of Fig. 1 in a subsequent stage of operation and showing certain structural features of mounting and assembly;

Fig. 5ª is an elevation on an enlarged scale of a fruit piercing element, certain parts of it being shown in longitudinal section;

Fig. 5ᵇ is a longitudinal central section on an enlarged scale of a preferred form of fruit piercing element;

Fig. 5ᶜ is a vertical transverse sectional view as seen along the line 5ᶜ—5ᶜ of Fig. 5ᵇ;

Fig. 6 is an elevation on a larger scale as seen along the line 6—6 of Fig. 1, certain parts being omitted, showing part of the ejector mechanism and related coacting parts;

Fig. 7 is a horizontal sectional view on an enlarged scale showing certain control mechanisms as seen along the line 7—7 of Fig. 2;

Fig. 8 is an elevation as seen from the left in Fig. 2, or from the bottom in Fig. 7, of the control mechanism; and Figs. 9, 10, 11, and 12 are fragmentary vertical sectional views showing parts of the control mechanism as seen, respectively, along the lines 9—9, 10—10, 11—11, and 12—12 of Fig. 8.

Similar reference characters refer to similar parts throughout the several views of the drawings.

The apparatus preferably comprises a base or box-like frame, generally indicated by the reference character 20, preferably constructed in any suitable way to provide opposed side walls 21 and 22 joined together by an end wall 23, an intermediate transverse wall 24, and an end wall 25 which is preferably detachably secured in position, as by screws 26 threaded into holes 27 (see Fig. 2) provided in an appropriate flange in the end of the base 20. The space between the walls 24, 25 (Fig. 1) is preferably closed at the bottom by a bottom wall 28 and at the top by a top wall 29, to provide an enclosure within which certain of the driving and operating mechanism is housed, and the space between the walls 23, 24 is preferably left open, both at the top, for the injection of the fruit, as is later described, and also open at the bottom, at as 30, through which the pressed remnants of the fruit are discharged from the apparatus, all as is later described.

At the upper portion of the intermediate wall 24 (Fig. 1) I provide a long bearing 31 for slidably guiding a plunger 32, at the left-hand end of which is mounted an externally convex and illustratively hemispherical presser 33 of a radius of curvature preferably somewhat less than the average radius of the particular fruit to be operated upon, which, for purposes of illustration, may be considered to be an orange. In Fig. 1 the presser 33 is shown in its withdrawn or at-rest position, suitable mechanism being provided to give it a moving stroke toward the left, followed by a retrograde stroke back to its at-rest position.

An illustrative and preferred mechanism for this purpose comprises a drive shaft 35 which is preferably and conveniently that of an electric motor 36, which is preferably detachably secured, as by screws 37, against the external face of the detachable wall 25, shaft 35 passing through a suitable hole in the latter. Shaft 35 carries a worm 38 which, through worm wheel 39, drives a shaft 40 that extends horizontally and transversely of the frame 20, being mounted in a suitable bearing 41 provided in the rib or flange-like inward extension 42 formed integrally with the end wall 25. At the right-hand end of shaft 40, as seen in Fig. 2 is a small gear 43 which meshes with and drives a larger gear 44 that rotates upon a stud shaft 46 fixedly carried in an appropriate mounting formed in the inward flange-like extension 42 of the end wall 25. Gearing 38 and 39 and 43 and 44 thus form a speed-reducing train of gears, large gear 44 being thereby driven at a sufficiently low rate to put the entire apparatus through one cycle of operation for each revolution of the main gear 44.

The right-hand face of gear 44, as viewed in Fig. 2, is by the above mounting thus made free of any obstruction, and in that face I provide a pin 47 (see also Fig. 1) which at its end carries a generally rectangular block 48 which is slidably fitted into the ways 50 formed in one face (the left-hand face as seen in Fig. 2, and the front face as seen in Fig. 1) of a lever generally indicated by the reference character 51.

Lever 51 is formed at its lower end (Fig. 2) to have a sleeve-like bearing 52 through which extends a pivoting pin 53, the ends of which are supported in an upstanding boss 54 and in the side wall 21.

For preferred purposes, later described, lever 51 is given a somewhat peculiar shape, being substantially a bell-crank lever in that it has an arm 51ª (Fig. 1), through one end of which the pivoting stud 53 passes, that makes a substantial angle with the other arm 51ᵇ, the ways 50 being formed in the arm 51ᵇ.

The upper end of arm 51ᵇ is suitably linked to the right-hand end (Fig. 1) of the plunger 32, preferably in such a manner as to impose its moving force during the forward stroke of the presser 33, through a spring 55, for purposes later described.

This linked connection may comprise two upwardly-directed and spaced parts 51ᵉ and 51ᶠ provided in the upper end of the lever arm 51ᵇ, one on each side of the plunger 32; to these parts 51ᵉ and 51ᶠ, as by pivot screws 56 and 57, are pivotally connected spaced links 58 and 59, the ends of which in turn are pivotally connected by a pin 60 to a head 61 that is provided with a bore through which the right-hand end of the plunger 32, which may be of somewhat reduced diameter, extends for relative sliding movement between the two, the end portion of plunger 32 being slotted, as at 62, throughout a substantial extent so as to accommodate the pivoting pin 60 as the head 61 slides relative to the plunger 32. Between the head 61 and the shoulder formed by the reduced portion of the plunger 32 is mounted the above-mentioned compression spring 55 which normally holds the head 61 in an outermost position along the plunger 32, a position limited by a cross-pin 64 carried in suitable holes in the two end parts of the slotted portion of the plunger 32.

The detachable end wall 25 is preferably shaped, as indicated at 25ª in Fig. 1, to form a laterally projecting housing or closure accommodating the right-hand end of the plunger 32 and the lever arm 51ᵇ and their connections, when in the at-rest position shown.

Upon drive of the main gear 44 in counter-clockwise direction as seen in Fig. 1, plunger 32 and its presser 33 are given a moving stroke toward the left, followed by a retrograde stroke, under coactions with other parts and under speed and force-applying conditions later described.

The upper portions of the opposed side walls 21, 22 and the end wall 23 are cut away, as at 66, throughout a region substantially juxtaposed to the presser 33, to detachably receive therein a sub-unit, generally indicated by the reference character 67 (Fig. 1), that carries certain apparatus and mechanism coacting with the presser 33, the injecting mechanism later to be described, and also the ejecting mechanism. Sub-unit 67 is provided with a wall 68 that is concave toward the convex presser 33, being substantially hemispherical (see also Fig. 3), excepting throughout its lower portions where it is cut away, as at 70. In radius of curvature it is materially larger than that of the presser 33. A portion of the wall 68 is of substantial thickness, as at 71, and throughout that portion it is provided with a suitable number of suitably distributed holes 72, the axes of which are parallel to each other and parallel to the moving stroke of the presser 33. Preferably they are uniformly or symmetrically distributed about the axis of the concave wall 68, that axis being preferably coincident with the axis of the presser 33. In Fig. 6 the portion of the wall 68 that is commensurate with the thickened part 78 is shown as having thirteen holes 72, one of which is at the axis or center and the rest are distributed about the center hole, preferably in several circular series, such as an outer circular series of eight holes and an inner series of four holes.

Projecting to the right as seen in Figs. 1, 3, and 5, and forwardly as seen in Fig. 6, from each hole 72 is a rigid tube 73, illustratively of metal, with the right-hand ends of the tubes 73 shaped to fall in a curved surface that is geometrically similar to that of the inside face of the wall 68 or to that of the convex surface of the presser 33, and if these surfaces are portions of a sphere, the ends of the tubes 73 can terminate in a spherical surface of a radius intermediate of the radii of the surfaces of the parts 68 and 33, substantially as shown. The tubes 73 project inwardly of the wall 68 throughout a distance somewhat greater than the thickness of the skin or rind of the fruit, such as the above-mentioned orange, that is to be operated upon.

Conveniently the tubes 73 are individual or separate elements which may be seated and secured, as by soldering, brazing, or the like, in the holes 72 which, because of the substantial thickness of the wall, as at 71, are thus given substantial and strong support and which thus may be of substantial over-all length. Each tube 73 also forms a bearing for slidably supporting a fruit-piercing element or prong 74 which, however, is so cross-sectioned in relation to the cross-section of the tube 73 that a free passage through the tube is present throughout the various relative positions which the piercing element and the tube may assume during operation. An illustrative and preferred cross-sectional relationship between the tubes 73 and the piercing elements 74 is to have the tubes 73 of circular cross-section and to have the piercing elements 74 longitudinally fluted, as by giving them a cross-shaped cross-section, as is better shown in Fig. 6, in which case each tube 73 and piercing element 74 provides four channels or passageways through which the juice of the fruit is to pass, as later described; with thirteen elements 73—74 a substantial number of channels for juice are thus provided.

Accordingly, it will be seen that by giving the tube 73 and the element 74 appropriate cross-sections in relation to each other, so as to leave one or more free passages from one side of the barrier-like wall 71 to the other, juice of the fruit can be transferred through such passage or passages from the region to the right of the wall 71, as seen in Fig. 1, to the other side of that wall, namely, to the left as seen in Fig. 1; illustrative relative cross-sections of these parts are later described. Moreover, the tubes 73, as above mentioned, project inwardly (to the right) beyond the face of the wall 68 and these projecting portions, when entered into the fruit through the skin, can thus in and of themselves form conducting passages or channels for the transfer of juice in the direction above mentioned.

In Figs. 1, 3, 5, and 6 all of the details of the piercing elements 74, in the various preferred forms of construction, are not shown in order to avoid unduly complicating those figures; though, as above pointed out, it is preferred that the tubes 73 and the piercing elements 74 have such relative cross-sections that, though one is slidable relative to the other, one or more free passages or channels is formed between the tubes and the piercing elements. Thus, where the piercing element 74 is substantially cross-shaped in cross-section, four channels or passages are formed by the coaction thereof with the internal walls of the tubes 73, it being understood that the longitudinal and end edges of the elements 74 may be bevelled or sharpened, as by grinding, if desired. However, the piercing elements 74 may be given other suitable cross-sections and may be constructed to have internal channels or passages for the passage of juice therethrough.

For example, I may provide one or more, or all, of the piercing elements 74 with internal passages or channels which are open-ended suitably at those portions that are to the left of the wall 71 and throughout those opposite end portions of these elements 74 that enter the fruit, so as to provide internal passages for the transfer of juice from the inside of the fruit in the direction above described. In one form, shown in Fig. 5ª, the internal passage or channel may comprise an axially extending bore or passage formed in any suitable way, such as by drilling a suitably sized bore throughout the length of the members 74 and preferably coaxial therewith. Such a passage is shown in the drawing at 74$^c$ (Fig. 5ª), being open at the extreme left-hand ends of the members 74 (Figs. 5 and 5ª), and in addition to being open at the right-hand ends, these channels or passageways 74$^c$ may be provided with side openings, as indicated at 74$^e$, and suitably distributed throughout those portions of members 74 that enter the fruit. The side openings 74$^e$ will also be seen to provide communications between the bore 74$^c$ and the channels or passages formed between the internal walls of tube 73 and the external configuration of the piercing elements 74.

An advantageous and preferred structure for the piercing elements 74 is shown in Figs. 5$^b$ and 5$^c$, where each element is longitudinally fluted externally, as indicated at 74$^g$, thus to provide passages 74$^h$ (four in number in the illustration) between the internal walls of the tubular element 73 and the piercing element itself, and the longitudinally extending vane-like flanges may be tapered or otherwise brought to a suitable edge, as is better shown in Fig. 5$^c$.

From the rear or left-hand end is formed a relatively large-cross-sectioned channel 74$^k$, as by drilling, and in making up the structure the drilling is halted at a point substantially spaced from the free or right-hand end of the element, as appears clearly in Fig. 5$^b$. Thereupon slots 74$^m$ are milled lengthwise through the wall portions that are at the bottom of the flutes, and where the piercing element is provided with four flutes externally, I preferably provide four slots 74$^m$. These slots terminate short of the left-hand end of the part (see Fig. 5$^b$) so as to leave a tubular shank 74$^o$ for mounting purposes, and in forming the slots 74$^m$, preferably by way of a relatively thin, saw-like milling cutter, the slots 74$^m$ are made to intersect the right-hand end or bottom of the drilled bore or channel 74$^k$ and are thence continued, as at 74$^p$, throughout a portion of the remaining or right-hand solid portion of the piercing element to provide forward extensions of the slots 74$^m$ and to provide the extensions 74$^p$ with outwardly divergent or sloping bottoms 74$^q$. The external portions of the right-hand or free end may be bevelled off, as indicated in Fig. 5$^b$, as by grinding along the planes 74$^s$, to bring the free end to a point where each of the flanges or vanes is thus ground away, or to a wedge where only two opposed vane-like parts are thus ground away. The slots 74$^m$ thus provide extensive longitudinally extending openings for the entry of juice therethrough and into the central bore or channel 74$^k$ and, as better appears in Fig. 5$^c$, the side slots form communicating channels between the passages 74$^h$ formed by the coaction of the tube element and the piercing element and the internal channel 74$^k$.

The piercing elements 74, of whatever of the above-described forms they may assume, are preferably mounted to form a unit by themselves, and for this purpose they are preferably secured at their left-hand ends, in any suitable way, to a suitably heavy disk-like plate 75 in order that, according to certain features of my invention, relative movement between the piercing elements as a unit and the part 68 with the tubes 73 may take place. A form of mounting is shown in Figs. 5ª and 5ᵇ, where the piercing element has a tube-like end portion at its lefthand end, receivable in a suitable hole 75ª in the plate 75, with the radially-outwardly projecting vane-like portions abutting against the righthand face of the plate 75, whence the tubular end parts 74° may be anchored in the plate 75 in any suitable manner, as by expanding it in any suitable way, particularly where the hole 75ª is appropriately tapered for the purpose, as indicated in Fig. 5ª.

In the at-rest position of the parts, the piercing elements 74 are held in a position to be substantially projected from the inner ends of the tubes 73, and this I preferably achieve by means of a compression spring 77 (Fig. 1) which is interposed between the end wall of a cap-like or cylindrical extension 78, preferably formed integrally with wall 23, and the disk plate 75. The spring 77 may be pre-compressed to the desired extent, and preferably it is provided with end plates 81 and 82 joined together by a bolt 83 to limit the expansion of the spring 77 and thus to facilitate disassembly when the parts are to be cleaned. End disk 82 may be dished inwardly of the spring and the end wall of the cap part 78 may be bulged outwardly, thus to provide an adequate range of movement for the left end of the bolt 83 when the unit of piercing elements 74 is moved to the left against the action of the spring 77, as is later described. Plate 75 is provided with a pair of integrally-formed vertical ribs 275 to hold the main face of the plate slightly spaced from end plate 81 in order not to obstruct the flow of juice from the left-hand ends of passages 74ᶜ or 74ᵏ.

As is better shown in Fig. 3, the lower portion of the hemispherical wall 68 is cut away, as at 70; however, a complement of that cutaway portion is provided in a shelf 85, the left-hand part of which, when it is in horizontal position as shown in Fig. 1, fills in or complements the cutaway portion 70 above mentioned, and the righthand portion of which projects a substantial distance toward the presser 33 and below the path of movement of the latter. Member 85 is suitably mounted for movement to shift from the horizontal position of Fig. 1 to a position substantially as shown in Fig. 3, and preferably this is achieved by mounting it upon a shaft 86 that extends transversely of the base 20 and has suitable bearings in the walls 21 and 22, the righthand end of the shaft 86 projecting externally of the base 20 (see Fig. 2) where it is provided with a lever arm 87 for controlled actuation as is later described. Preferably the connection between shelf 85 and shaft 86 is constructed to be readily separable so that shelf 85 may be easily removed. For example, the shaft 86 has rigidly secured to it two spaced blocks 89 and 90 (see Fig. 3ª) against which the shelf member 85 rests and which are shaped to form suitable seats against which the shelf 85 fits; the blocks have suitable parallel holes formed therein for the reception of pins 91 and 92 that are secured to and depend from the shelf member 85, and with the pins, which may be split spring pins, forming a friction-type of fit with the holes in the blocks, shelf member 85 with parts carried by it may thus be easily removed from the shaft, for cleaning purposes and the like. Nevertheless, with the pins or studs 91—92 received in the block holes or sockets, a dependable driving or control mounting of the shelf 85 on shaft 86 results.

The right-hand portion of the shelf part 85 is adapted to form a rest for a fruit, illustratively an orange O, as indicated in Fig. 1, to initially position it in proper coacting relationship to the various parts which operate upon it to extract the juice, and preferably I provide means to accommodate it to different average diameters or sizes of fruit in order that the latter be positioned more or less in coaxial relationship to the pressing and juice-extracting parts. For this purpose I preferably provide the shelf 85 with suitable means for raising or lowering the effective floor or support that it can present to an orange, and such means preferably comprises two blade-like members 95 and 96 (Figs. 1, 6, and 3) which are transversely spaced from each other and are accommodated in slots 85ª and 85ᵇ, respectively, which extend longitudinally of the shelf member 85, one on each side of its longitudinal axis. At their right-hand ends the parts 95 and 96 and the shelf part 85 are hinged together, as by a hinge pin 97 which passes through suitable ears formed in the shelf 85 and through suitable holes in the ends of the platform blades 95 and 96, and since the slots 85ª and 85ᵇ give the shelf part 85 some degree of "give" or yieldability in a transverse direction, the hinge pin 97 is preferably in the form of a bolt headed at one end and threaded on the other end to receive a wing nut 98 (Figs. 1 and 3), by which the slotted end portions of the shelf part 85 may be drawn together and thus clamp the pivoted platform blades 95—96 in the position to which they have been manually set to position their upper orange-supporting edges at the desired elevation above the upper face of the platform part 85 itself, where the fruit is of some smaller diameter. Preferably the platform blades are shaped as is better shown in Figs. 1 and 3 to provide supporting edges that slope downwardly toward the left in Fig. 1, at least throughout the major length of their adjustment, and thus let the orange received thereon roll toward the left.

The orange O is supplied to the supporting platform 85 from a suitable source of supply, which preferably takes the form of a hopper 100 which may be of substantial expanse, as indicated, to receive a substantial quantity of oranges, being provided with bottom walls that slope downwardly and inwardly to an opening 101 which is of a width to easily take the larger diameter of fruit to be handled and which is of a length materially greater than the width, illustratively almost twice as long, as indicated in Figs. 1 and 2. The hopper 100 is suitably supported at the upper ends of upward extensions of the side walls 21 and 22, and the space between the front portions thereof being at least partially closed off by a curved wall 102 (Fig. 1) to form, in coaction with other parts, a guide and rest for individual oranges during their successive passage from the hopper 100 to the shelf part 85.

Suitable provision is made to insure the transfer one by one of the fruit from the hopper to the shelf part 85, in timed relation to the operation of the other mechanism, and preferably I provide first suitable means to insure the entry of one orange at a time through the hopper bottom opening 101 to the guide rest 102, and to prevent jamming of such an orange by other oranges during its passage thereto. Thus I provide a shaft 103 (Fig. 2) rotatably mounted in suitable bearings in the side wall extensions 21, 22 and having mounted thereon two fingers or arms 104, 104 spaced apart by a distance materially less than the diameter of the orange. As seen in Fig. 1, they project toward the right across the opening 101, leaving so much of the latter unobstructed as will permit the passage of a single orange downwardly from the hopper, particularly an orange that is more or less guided by the inclined wall 100ᵃ of the hopper. The fingers 104, 104 I arrange to be oscillated or actuated at an appropriate time to move them in counter-clockwise direction and thus thrust upwardly and toward the left such orange or oranges as tend to move downwardly toward the right along the hopper wall 100ᵇ, or as are pressed downwardly by other oranges of upper layers of the mass that might be heaped into the hopper 100. The fingers 104, 104, at the appropriate moment, thus clear the opening 101 of obstructing oranges and thus insure the descent of a single orange onto the guiding wall 102.

Continued descent of an orange along wall 102 is halted by a transfer mechanism which comprises a frame 106 (Figs. 1 and 2) mounted upon and pinned, by a hub 107, to a shaft 108 that is provided with bearings in the upper extensions of the walls 21 and 22 (Fig. 2), the hub 107 having upstanding therefrom spaced side plates 110, 110 shaped substantially as shown. Side plates 110, throughout the upper right-hand portion as seen in Fig. 1, carry a suitable number of shafts or pins 111 arranged along an arc, the center of which is at the axis of the shaft 108, and the pins 111 carry rollers 112 which are preferably thinner at their midpoint, gradually increasing in diameter (see Fig. 2) along a curvature more or less commensurate with that of the fruit to be handled, outer portions of the plates 110, 110 being flanged or flared outwardly to form substantially continuations of the just-described curvature of the rollers 112. Between the lower left-hand portions of the side plates 110, 110 is formed or extends a concave bottom wall 113 (Fig. 1), with the adjacent portions of the plates 110 appropriately shaped, as by outward flaring, and with the wall 113 terminating in proximity to one of the rollers 112 so as to form a pocket or seat in which a single fruit or orange may be seated. By way of the shaft 108, the transfer structure 106 may be rocked in appropriate timed relation to the other mechanism, from the position shown in Fig. 1, where one or more of the rollers 112 forms a stop against which an orange on the chute or wall 102 rests, first to a position displaced clockwise from that shown in Fig. 1, with the rollers 112 during the movement simply rolling past the stopped orange, thus to position the pocket formed by the wall 113, plates 110, and end-most roller 112 directly juxtaposed to the stopped orange which thus enters the pocket; subsequent rocking or swinging in counter-clockwise direction, to the full-line position shown in Fig. 1, thus carries the pocketed orange to the left and over the axis of the shaft 108, the left-hand roller 112 aiding in holding the orange in the pocket during the initial stages of this transition movement particularly. When that arc of movement is substantially completed, the orange drops out of the pocket and onto the shelf part 85 above described.

As the orange is transferred by the mechanism 106, it makes way for another orange to descend into the chute or onto the sloping wall 102, and the actuation of the fingers 104 is timed with the actuation of the transfer mechanism 106.

Shafts 86, 108, and 103 conveniently project beyond the right-hand wall 21 (Fig. 2), along the outer face of which I provide certain of the actuating mechanisms therefor so as not to obstruct any of the above-described movements of the orange or other fruit. On the outer end of shaft 103 is secured an arm 116 which is connected by a link 117 to one of the two arms of a two-armed lever 119 that is secured to the shaft 108 by means of a split hub 119ᵃ that is clamped to the left, as by a clamping screw 120. Counter-clockwise swinging of the two-armed lever 119 thus swings the transfer structure 106 directly through the shaft 108 (to the full-line position in Fig. 1), and through the link 117 and arm 116 swings the shaft 103 and the fingers 104 also counter-clockwise, thus, by the fingers 104, to push oranges upwardly and away from the hopper opening 101 and thus clear the path for the entry of a single orange therethrough to be stopped by the rollers 112, as above described. Subsequent clockwise swing of the two-armed lever 119, to position the pocket of the transfer mechanism to receive the stopped orange, swings the fingers 104, 104, through the link 117 and arm 116, also in clockwise direction, to permit rearrangement of the oranges in the hopper by gravity and thus to insure that they are all successively fed through the hopper opening 101, even to the last one.

Actuation of the two-armed lever 119 is effected by a link 122 connecting the lever to an arm 123 that is rigidly secured to a shaft 124, as by a split hub 124ᵃ provided with a clamping screw 125 (Fig. 2), shaft 124 having a suitable bearing in the side wall 21 through which it thus extends into the interior of the box-like frame or base, where it has secured to it a lever or arm 127 (Fig. 1), as by a split clamping hub 127ᵃ provided with a clamping screw 128. The upper end of the arm 127 carries a cam follower or roller 130 (Figs. 1 and 2) for coaction with a cam 131, shaped as is better shown in Fig. 1 and secured to the shaft 46 along one face of the main driving gear 44. Externally of the base the arm 123 (Fig. 1) has secured to it one end of a tension spring 133, the other end of which is suitably anchored externally of the frame or base, and through this spring 133 the cam follower 130 is always biased and held against the peripheral cam edge or face of the cam 131. With the latter shaped as shown in Fig. 1 and positioned as there shown in relation to the crank-pin 47 on the other face of the gear 44, the above-described actuation of the two-armed lever 119 is made to take place in appropriately timed relation to the strokes of the plunger 32 and its presser 33. Accordingly, with an orange positioned on the shelf part 85, as above described, and with the driving gear 44 and cam 131 moving in counter-clockwise direction in Fig. 1, the cam follower 130 and its arm 131, and hence the two-armed lever 119, remain at rest for a substantial period of time, approximately two-thirds of a revolution, because throughout that extent, as shown in Fig. 1, the cam edge of cam 131 is substantially of uniform radius; the crank-pin 47 and slide-block 48, partaking of counter-clockwise rotary movement, coact with the ways 50 of the L-shaped lever 51 and swing it in counter-clockwise direction to move the plunger 32 and presser 33 to the left, presser 33 engaging the orange 6 and pushing it to the left against the piercing elements 74 above described. A first-stage of movement of the orange to the left causes the numerous piercing elements 74 to cleanly cut through the rind on one side of the orange 6, the end face of the fluted or cross-shaped piercing elements 74 being appropriately sharpened or brought to a good cutting edge for that purpose so that they cut their way through and thus lessen risk of tearing or breaking the rind in order that the entered piercing elements substantially seal the openings against material loss of juice. This piercing can thus take place before there is material deformation of the orange by the presser 33.

As above described, the parts 82 and 83 and 81 limit the expansion of the spring 77, and these parts are so adjusted that with the end plate 82 engaging the end wall of the casing 78, the opposite spring plate 81 is spaced from the end wall 71 by a distance greater than the thickness of the plate 75 which carries the piercing elements 74. The spring 77 is thus prevented from pressing the plate 75 against the face of the wall 71 in which the left-hand ends of the tubes 73 terminate, and thus these tubes are not closed off against discharge of juice or liquid therefrom. The initial engagement of the orange with the piercing elements 74 pushes the latter and their mounting plate 75, as a unit, slightly toward the left, thus to insure uncovering of the discharge channels or passages, the piercing elements being thereafter backed up by the plate 81 of the spring unit against which the mounting plate 75 is pressed. Continued movement of the orange to the left thereupon enters the tubes 73, which project forwardly from the hemispherical or concave wall 68, into and through the respective openings cut by the piercing members 74, the left-hand wall or rind portion of the orange coming to a halt as it engages the end wall 68 between which and the orange, however, is interposed an ejector 135 which is preferably made of relatively thin material, such as sheet metal; it is better shown in Figs. 6 and 3, and is later described in greater detail. During this stage of movement of the orange 0, without material deformation by the presser 33, the crank-pin 47 (Fig. 1) is moving from about a 2 o'clock position to about an 11 o'clock position, and the spring 55 at the end of the plunger 32 may as yet not be materially strained or compressed.

The presser 33, as will now be clear, moves with its axis along a line with which a diameter of the orange 0 is substantially coincident, the upward concavity of the shelf part 85 or the two platform blades 95 and 96 (see Fig. 6) insuring that the orange is positioned with the just-mentioned diameter falling in substantially the vertical plane through the axis of the presser 33 and the plunger 32, and the adjustability of the platform blades 95—96 making it possible to have that diameter of the orange fall substantially in the horizontal plane through the axis of the presser 33. The presser 33 has an annular flange 33ᶜ (Figs. 1 and 5) which, with a portion of the spherical or curved face of the presser 33, forms an annular seat in which is received, and secured in any suitable way as by means of any suitable cement or by vulcanization, an annular yieldable and preferably resilient cushioning and sealing member 134, which is preferably made of rubber and illustratively and preferably may be made of so-called "spongy" rubber in which, however, the cells are preferably closed, so that, though the member is compressible and can recover due to its resiliency, it is preferably impervious. As is better shown in Fig. 1, the member 134 projects a substantial distance forwardly (to the left), surrounding the hemispherical presser part 33, and in external diameter it is somewhat less than the internal diameter of the mouth of the hemi- spherical or concave face of the wall 68 against which the ejector 135 normally rests, thus to insure ease of entry, upon continued movement to the left of the presser, of the resilient annulus 134 into and against the concave face of the wall 68 with which to make sealing engagement. The flange-like annular part 33ᶜ may be cut away or slotted at its upper and lower portions to clear the part 113 when the latter is in the position shown in Fig. 1 and also to clear and accommodate the platform blades 95—96 throughout whatever positions they occupy according to their adjustment, the yieldability of the resilient annulus 134 making the latter self-accommodating to such of these parts as might be in its path of movement. In internal diameter the resilient annulus 134 may be somewhat less, as indicated in Fig. 1, than the maximum diameter of the presser 33.

From about the 11 o'clock position of the crank-pin 47, in its counter-clockwise rotation and with the left-hand wall of the orange 0 stopped by the part 68, the continued movement of the presser 33 commences effective deformation of the right-hand wall or rind portion of the orange, and the resilient annulus 134 is brought toward and into the mouth and of the concave wall 68, being by the latter deformed radially inwardly, thus in effect to close the annular gap that comes into being between the presser 33 and the concave wall 68, including portions of the shelf part 85, and as the deformation of the orange proceeds, the resilient annulus 134 is pressed tightly against annular portions of the orange, being dependably backed up by the above-mentioned parts 68, 85, and 33, as well as the supporting flange 33ᶜ. The compression of the orange proceeds with increasing force, and due to the decreasing angularity of the ways 50 in the lever 51 in relation to tangents to the crank-pin at points in its rotary path, the maximum compression will occur when crank-pin 47 reaches about the 9 o'clock position. Due to the angle that ways 50 of arm 51b makes with arm 51a of lever 51, the maximum pressure position will be reached at about 9 o'clock position of crank-pin 47 instead of at a lower position of said crank-pin that would occur if the lever 51 were straight. Thus at the maximum pressure position of crank-pin 47, it will be positioned further from the pivotal axis 53 than if the lever 51 were a straight lever and thus produce a larger effective lever arm, measured from the pivot 53 to the point of engagement of lever 51 with crank-pin 47, than the effective lever arm would be if a straight lever were used. With the fruit now being compressed between the wall 68 and the presser 33, expulsion of the liquid or juice contained therein proceeds along the passageways or channels provided by the structures and preferred interrelationship of the tubes 73 and the piercing elements 74, as above described. During these and continued compressing actions on the orange, the resilient and now materially compressed resilient annulus 134 backs up and conforms itself to a band-like portion of the orange, particularly that portion, as is better shown in Fig. 5, that becomes doubled back upon itself, and is effective to force that portion toward the left as viewed in Fig. 5, thus resisting the achievement of too sharp a bend in the skin or rind and thus resisting cracking or fracturing of the rind, so as to tend to maintain that portion of the rind intact and achieve better expulsion of the juice. However, should the rind break or fracture, particularly at these reversely flexed portions, the resilient annulus 134, being preferably impervious, forms a seal of the fractures or cracks and also forms a substantial seal with the adjacent mechanical parts, and thus continued compression or pressure application to the orange can proceed without material loss of juice.

The tubes 73 conduct the juice from the inside of the fruit through the wall structure 68—71, discharging it to the left and externally of the wall 71 where these passageways are unobstructed because the mounting plate 75 is held well to the left of the wall 71 and against the spring plate 81. Juice is also conducted through the internal channels or passages 74c (Fig. 5a), where the members 74 are so constructed, and it enters at the right-hand ends of the members in Fig. 5a, and through the distributed side openings 74e, discharging from the passages 74c which are open at the left-hand face of the mounting plate 75 (Fig. 5). Because of a preferred construction given one of the members 74, as indicated at 74a and 74b in Fig. 5, and later described, the right-hand end of channel 74c in that member is preferably closed off in any suitable way, and in such case juice enters through the side openings 74e. Where the piercing members are constructed as shown in Figs. 5b and 5c, the juice enters the central channel or bore 74k through the longitudinally extending side walls 74m, discharging from the left-hand end of the channel 74k and hence to the left of the plate 75, and the juice may also discharge to the left of the wall 71 through such portions of the slots 74m as are exposed to the left of the wall 71, depending upon the position of the piercing elements relative thereto. When the construction of Figs. 5b and 5c is employed, the middle member, intended to be indicated by the member 74a, is also preferably given a greater length, as is later described. The under-portion of the cap-like casing extension 78 is shaped to provide a discharge opening or spout 136 (Fig. 1) in overhanging relation to a suitable support 137 on which may rest a suitable container, such as a glass G, to receive the liquid.

The emerging juices are thus not contaminated, by oils or other undesirable ingredients from the rind, even from those regions in the latter where the rind has been cut by the piercing elements, for the tubes 73 project therethrough to a substantial extent inwardly of the rind (see Fig. 5) and the internal juices pass out from the interior of the orange 0, through these tubes. Though the external walls of the tubes make a fairly good seal with the walls or flaps of the apertures cut by the piercing elements, liquid or other constituents from the external portions of the rind do not contaminate the sought-after juice because, to do so, they would have to enter the inside of the orange in order to be discharged with the juice through the tube passages or channels, and such entry into the inside of the orange is opposed because of the greater hydrostatic pressure internally of the orange, due to the action of the presser 33, than exists externally thereof, due to openings 138 to the atmosphere so that, even though small inconsequential portions of juice leak out through the joint between the rind openings and the external walls of the tubes 73, such minor loss is in a direction to oppose entry of undesirable oils or the like and, in fact, to wash or force it away from possible entry into the inside of the orange. Any such liquid ingredients from the rind, together with possible leakage of juice as above described, are maintained physically segregated and from joining the extracted or expelled juice, by the action of the inside or concave face of the wall 68 (Figs. 1 and 5) down which any such material can make its way to emerge through openings 138 in the lower portion of the wall 68 where it overhangs the space to the right of the end casing wall 23, on the other side of which the discharge spout 136 for the uncontaminated juice is provided.

As the presser 33 continues to compress the orange between it and the wall 68, now with increased force, as above described, and continues the concave deformation of the right-hand half or wall of the orange, the piercing elements 74 are made to partake of a withdrawing or receding motion in order to clear the internal passages which have formed throughout the internal orange segments and their skins, and also to prevent them from cutting or macerating the right-hand and now concave portion of the rind. At this point it should be noted that it is preferred to have the piercing elements 74 of substantial length so that during the initial piercing operation they do more than just pierce the rind, but also cut a corresponding number of passageways through the interior of the fruit and its sections, preferably to an extent somewhat more than the radius of the fruit, so that fruit sections and their skins that should lie to the right of the central plane of the orange, as seen in Fig. 1, are thus also pierced. Accordingly, I make suitable provision for effecting a retrograde or withdrawing movement of the piercing elements 74 toward the left in Fig. 1, preferably by means that operates in timed relation to the moving stroke of the presser 33, and arrange also for the restoration of the piercing elements 74 to the desired forward position. Where the piercing elements 74 are as a unit backed up by a spring, as in the preferred arrangement above described wherein spring 77 and related parts are employed, I preferably also utilize the spring to coact with the mechanism for controlling the movements of the piercing elements, and a simple and dependable arrangement comprises an extension of one at least of the piercing elements, such as the central element 74a (Figs. 1 and 6), which is aligned along the axis of the plunger 32 and presser 33. As is better shown in Fig. 5, element 74a is extended or made longer than the remaining elements 74 by an amount somewhat in excess of the thickness of the rind or skin of the fruit to be treated, and I may also and preferably give this extended end portion a wedge-like shape, as at 74b, as by grinding or bevelling off two of the opposed rib portions of the cross-shaped member. Accordingly, after the presser 33 has pushed the orange 0 to the left in Fig. 1 sufficiently to bring the left-hand part of the orange against the wall 68 and thus to enter all of the piercing elements 74 well beyond the central vertical plane of the orange, the continued movement to the left of the presser 33, now materially concaving the right-hand portion of the orange externally, presses the center of the right-hand skin or rind against the extended piercing element 74a which thus enters the rind and is engaged by the forward portion of the presser 33 which is preferably provided, as at 33a (Fig. 1), with a depression or socket to receive the extreme end portion of the wedge-shaped extension 74b. Though the rind may thereby be pierced, yet the wedge-shape of the extension tends to maintain a seal in the pierced hole, the higher internal pressure acting to oppose inflow of oil or other ingredients from the external part of the rind, and should any leakage occur, it aids in avoiding contamination of the juice, discharging ultimately through the openings 138 above described.

Continued movement of the pressure 33 to the left now carries or forces with it, through the extension 74ᵃ, the entire pierced unit, including the mounting plate 75, which is forced to the left against the action of spring 77, which yields, and thus the withdrawing movement of the piercing elements is made to take place and piercing and maceration of the opposed rind wall by all of them is prevented. The position of the presser 33 farthest to the left, with this arrangement, is limited by the maximum compression of the spring 77 or the extent to which the spring-opposed plate 81 is permitted to move toward the left. This position is reached preferably somewhat before the crank-pin 47 reaches the 9 o'clock position, as seen in Fig. 1; thus it may be reached at about the 10 o'clock position or somewhat nearer the 11 o'clock postion, and from that point on the continued rotary movement of the crank-pin 47 continues to swing the lever 51 toward the left, compressing the spring 55 at the right-hand end of the plunger 32, so as to maintain the orange or other fruit in its maximum deformed and compressed condition, substantially like that shown in Fig. 5, throughout a substantial interval of time in order to insure that the remaining juice therein has adequate time to be forced and flow out of the many passages provided by the tubes 73. This arrangement provides an adequate time interval, extending from commencement of compression of the spring 55, through maximum compression thereof, and terminating only after such return swing of the lever 51 by the crank-pin 47 has taken place as will restore the spring 55 to its expanded condition as limited by the pin 64.

Thus some "squeezing" takes place, even during commencement of the return stroke of the operating lever 51, and upon its termination, with the crank-pin 47 now operating throughout a path or arc that is closer to the pivoting shaft 53 of the lever 51, a quick return swing of lever 51 is effected, thus effecting a quick withdrawing movement of the presser 33. During all of the above "squeezing" actions, however, the resilient annulus 134 effectively supports and backs up what would otherwise be an unsupported portion of the orange, and also exerts pressure thereagainst; upon withdrawal, it recovers to normal undeformed shape.

Before the withdrawal of presser 33 is completed, the cam 131 commences to swing the follower arm 127 in counter-clockwise direction, the external lever arm 123 commencing the actuation of the transfer mechanism 106 and of the fingers 104, 104, as above described; but, through the link 140, lever 123 also actuates the shaft 86 carrying the shelf 85, link 140 connecting the arm 123 and the external lever arm 87 on shaft 86. The shelf 85 is thus given a quick tilt in clockwise direction to the position shown in Fig. 3, carrying with it the ejector 135 which is secured to its left-hand end and which, referring to Figs. 6 and 3, can comprise a relatively thin sheet-metal stamping, concaved to give it the shape of a portion of a sphere to match the curvature of the wall 68 of Fig. 1, being cut away, as at 135ᵃ, 135ᵇ, and 135ᶜ, so as to let the tubes 73 and the piercing elements 74 project therethrough; the ejector 135 is rigidly secured to the left-hand end of the shelf part 85 in any desired way, as indicated at 141. The ejector 135 thus insures that the now much-compressed remnant of the fruit is disengaged from the projecting tubes 73 and the projecting portions of the piercing elements 74, which, during the retrograde stroke of the presser 33, move to the right under the follow-up action of the spring 77. The ejector 135 thus strips the compressed fruit remnants from these projecting parts and in effect flips them downwardly (see Fig. 3) into the space between the walls 23 and 24 (Fig. 1), through the bottom opening 30 from which it can pass into a suitable receiving or refuse container. The shelf part 85, with its ejector 135, however, is quickly flipped back to the position shown in Fig. 1, and just about when it is restored to its normal position, the transfer mechanism reaches a position to discharge an orange from its pocket and onto the shelf part 85, whence the cycle of operations may be repeated.

In the just-described ejecting action, ease and dependability of action are enhanced by the coaction of the elements 74 and the spring 77 under the control of the presser 33. For example, and referring to Fig. 5, when the retrograde movement (to the right) of presser 33 commences, the elements 74, being at their left-most position and spring 77 being compressed, follow the retrograde movement of the presser 33 toward the right to the extent permitted by bolt 83. Such movement toward the right of the preferably numerous elements 74, with the ends of all of them (excepting the center element 74ᵃ) being within the compressed fruit and closely adjacent the right-hand rind wall thereof as seen in Fig. 5, exerts thrusts upon the squeezed or compressed fruit in a direction toward the right, engaging the inside of the right-hand wall rind if necessary, and thus can exert a push in a direction toward the right tending to loosen the left-hand rind wall of the compressed fruit from the conducting tubes 73. In such manner also substantial disengagement of the compressed fruit from the inner ends of the tubes 73 may be effected so that, upon the subsequent relatively quick clockwise flipping movement of the supporting shelf 85 and the ejector 135, the latter meets with lesser opposition or resistance in that the just-described action of the members 74 can effect a material loosening up or removal of the left-hand rind wall relative to the projecting tubes.

With such coactions the ejector 135 performs principally the burden of stripping fruit remnants from the projecting portions of all of the members 74, but this operation is a relatively easy one inasmuch as the holes in the rind, through which the tubes 73 project, are materially larger than the cross-section of the elements 74, and hence ease of stripping the fruit remnants from the elements 74 results. The relative external cross-sections of the parts 73 and 74 can thus be made to coact to facilitate speed and ease of ejection.

The action of the part 68, on the one hand, and the presser 33 on the other, between which the fruit is subjected to compression, is made exceedingly efficient due to the coaction therewith and the action upon the fruit of the companion resilient member 134 through which compressive forces are also exerted but in such manner that the member 134 materially sustains the most deformed or most vulnerable portion of the skin or rind so as to lessen fracture or breakage, while, on the other hand, even though fracture or breakage may take place, the sealing action achieved by the member 134 upon the fractured rind and upon also the coacting mechanical parts insures against material loss of juice and is capable of forcing a maximum of juice out of the orange and through the various discharge channels above described. Moreover, very substantial extent of compression may thus be effected without impairment of this high efficiency.

Though substantial internal pressures may thus be created, tendency to force solid matters out along with the juice is opposed by various features of the preferred forms of piercing elements employed. Thus, for example, where the piercing elements 74 take the form shown in Fig. 5$^a$, a large number of side openings 74$^e$, preferably of small size, may be employed so as in effect to act like a filter to prevent passage of solid matters, the above-mentioned stripping action of the fruit remnants from the projecting piercing elements in effect wiping off solid matters that are thus strained out by the small side openings 74$^e$. Where the piercing elements take the form shown in Figs. 5$^b$ and 5$^c$, the longitudinal slots 74$^m$ may, if desired, be given relatively small widths to achieve suitable filtering or screening action, and in such case, as well as when they are made of greater widths, substantial removal of solid matter is facilitated, during the above-mentioned stripping action, by reason of the side slots 74$^m$ being open at their right-hand or free ends, aided by the outwardly divergent slopes of their bottoms 74$^q$, as above described, the latter facilitating endwise discharge from the slots and from the bore 74$^k$ of accumulated solid matter. Moreover, this facility of discharge also makes it possible to give the side slots 74$^m$ substantial widths.

Furthermore, whatever solid matters are passed through with the juice will be seen by any of the above-described constructions to be pretty much comminuted for, for free passage through any of the channels, openings, slots, or passageways, all of which, though they may vary in size, are substantially of small cross-section, a fragmentation or comminution of the solid material has to take place.

Attached to the side wall 24 is a switch and control casing 143 (Figs. 7 and 2), which comprises a frame 144 and an enclosing box 145; to the right-hand portion of the frame 144 (Fig. 7), by a suitable block 146 of insulation, are mounted two conductive spring elements 147 and 148 which are provided at their opposed free ends with trunnions to rotatably support a known type of rotary mercury type of switch that comprises a closed casing or envelope 149 containing a pool of mercury and two radially extending electrodes which are conductively carried by coaxial conductive hub elements on the envelope 149 and by which the switch structure is rotatably mounted in the trunnion which thus also form the electrical connections to the two internal electrodes. The mounting of the switch 149 on the trunnions of the spring conductive elements 147—148 thus also places the switch in the electrical circuit which comprises conductors 150 and 151 which are suitably related to the circuit of motor 36 so as to place the switch in series therewith to control its starting and stopping.

Projecting to the left from the switch casing 149 (Fig. 7) and positioned eccentrically with respect to the pivoting axis of the switch 149 is a pin 152 which, at its left-hand end, in Fig. 7, is bent at right angles and seated in a suitable hole 153 on a shaft 154 that is rotatably mounted in the casing and frame structure 143—144. Accordingly, a rocking or swinging movement communicated to the shaft 154 correspondingly moves the switch 149 about its axis to swing the internal electrodes into or out of the pool of mercury which, of course, remains always at the lower portion of the switch container or envelope 149, thus to make or break the circuit of the motor 36.

Slidable upon shaft 154 and splined thereto (see Fig. 10) is a lever 155 that has a handle 156 projecting through a slot 157 in the control casing box 143, the lower edge of the slot 157 being provided with notches N$^1$, N$^2$, N$^3$, and N$^4$ whereby the lever 155 may be manually slid along the shaft 154 and then depressed to enter it into any one of these notches, thus to fix any one of the illustrative four positions.

To the rear of shaft 154 and parallel to it is rotatably mounted, in suitable bearings in the frame 144, a shaft 158 provided with three cams 161, 162, and 163 and positioned, respectively, opposite the notches N$^1$, N$^2$, and N$^3$; opposite the notch N$^4$, the shaft 158 is blank or has no cam.

Near the left end of shaft 158 I provide a ratchet wheel 164, and adjacent to it and freely rotatable on a reduced portion of the shaft 158, by way of a hub 165, is an arm 166 to which is pivoted a ratchet pawl 167 to coact with the ratchet wheel 164 to effect step-by-step rotary movement of the shaft 158. The arm 166 is connected by a link 168 to an arm 170 secured to that end of the ejector and tray-carrying shaft 86 that projects externally from the side wall 22 (Fig. 2) and, accordingly, the pawl 167 is given a complete cycle of two strokes every time that the cam 131 (Fig. 1) puts the ejector and tray part 135—85, at the end of a complete cycle, through a stroke of tilting movement, into the position shown in Fig. 3, followed by a quick return tilt to normal position shown in Fig. 1. Ratchet wheel 164 is provided with teeth, illustratively six, and the linkages are so proportioned that on the stroke of shaft 86 into ejecting position of the parts as shown in Fig. 3, the pawl 167 rides in counter-clockwise direction (Fig. 9) over one tooth, and on the reverse stroke of shaft 86 to restore the ejector and tray, the pawl 167 picks up that tooth and through the ratchet wheel 164 gives the shaft 158 and the cams 161, 162, and 163 a corresponding rotary movement 60 degrees in the illustrative embodiment.

The hand-set lever 155 has a tail-piece 172 (Fig. 10) which coacts with projections on the cams, according to whichever of the three cams is selected by the selectable positioning of the lever 155, along the slot 157 (Fig. 8). If it is desired that the apparatus go through only one complete cycle, as when the juice of only one orange is desired, the lever 155 is slid along shaft 154 and the handle part 156 depressed into notch N$^1$, thus raising the tail-piece 172 and positioning it in the path of rotary movement of the projection on cam 161, of which there are six projections, the rotary movement of shaft 154, when the lever 156 is pressed into notch N$^1$, rotating the switch casing 149 to circuit-closing position, whence the motor starts, the apparatus performing the cycle of operations above described, with the ratchet pawl 167 (Figs. 7 and 9) picking up one tooth and rotating the shaft 158 and its cams through 60 degrees, whence one of the projections on cam 161 tilts the lever 155 in counter-clockwise direction and to the dotted-line position shown in Fig. 1, thus halting the motor.

If the juice of two oranges, and hence two cycles of operation of the apparatus, is desired, the control lever is slid along slot 157 and depressed into notch N², thus starting the motor and operatively positioning the tail-piece 172 with respect to cam 162 which has three equidistantly spaced projections, so that it requires two working strokes (clockwise in Fig. 9) of the pawl 167 to cause the tail-piece 172 to be swung into the dotted-line position of Fig. 10, and the motor stopped. On the other hand, for example, if the juice of three oranges is desired, the apparatus is made to go through three cycles, in that the control lever 156 is shifted along slot 157 and depressed into notch N³, thus starting the motor and lifting the tail-piece 172 into the path of the notches on cam 163 which, however, has only two notches, so that it requires three working strokes of the pawl 167 with three corresponding step-by-step rotary movements of shaft 158 to achieve an actuation of the lever 155 in counter-clockwise direction, that taking place on the last of the several rotary steps of shaft movement.

If it is desired that the apparatus continue its operation in repeated cycles, the control lever 155 is shifted along slot 157 and depressed into notch N⁴, thus starting the motor, whence the apparatus continues operation for as long as may be desired until the control lever 155 is manually shifted upwardly out of notch N⁴, thus to rotate the shaft 154 and the switch casing 149 and stop the motor. The upper edge of slot 157 (Fig. 8) limits the counter-clockwise (Fig. 10) rotary position of the shaft 154 for any of the positions of the control lever, the handle portion 156 engaging that upper edge when the lever is in the dotted-line position of Fig. 10.

Inasmuch as the sizes of the oranges or the amounts of juice that any of then contain can vary, I make provision also for controlling the apparatus according to the quantity of juice delivered, preferably with a container or glass G, according to the weight of the juice added to the weight of the container G itself. Thus I may mount the container rest 137 (Fig. 1) at one end of a lever 174 that extends externally along the lower portion of the side wall 22 of the base or frame 20, from which it is pivotally supported in a suitable bracket 175 providing, for example, a knife-edge type of pivot 176 (Fig. 1). To the right of the pivot 176 the lever 174 has slidably mounted upon it a weight 177 by which the desired weight or quantity to be delivered may be set. With the container G empty, the weight 177 overbalances the weight of the empty container G and of the container rest 137 underneath which may be provided a stop element 178, carried by a ring-shaped frame extension 180 which may be provided for limiting downward movement of the rest 137. The switch 149 (Figs. 7 and 8) is provided with a forwardly extending arm or lever 181 which passes through an opening 182 in the front wall of the casing 143, whence it is pivotally connected by a link 183 to the extreme end of the balance lever 174. With the container G empty, the weight 177 on the balance lever 174 swings the switch 149 into circuit-closing position and with it swings the shaft 154 (Fig. 7) and also the splined control lever 155, the control lever, for the measured quantity operation, being simply slid along shaft 154 into juxtaposition to the notch N⁴ (Fig. 8) so as to remove it from coaction with the cams. When the apparatus has delivered sufficient juice to the container G to overbalance the weight 177, the lever 174 is rocked in counter-clockwise direction (Fig. 1), to the extent limited by the stop 178, the opposite end of the lever 174, through the link 183, swinging the switch 149 and shaft 154 in counter-clockwise direction (Fig. 10), thus opening the motor circuit and stopping the motor, the parts being preferably so proportioned that the container rest 137 engages the stop 178 (Fig. 1), the handle portion 156 of the control lever 155 engages the upper edge of the slot 157 to fix the final "off" position of the switch 149, and desirably also switch lever 181 at the same time engages the upper edge of the opening 182. When the motor is thus stopped, the control lever 155 is simply slid somewhat to the left so that its handle 156 overlies the upwardly projecting portion of the front casing wall that intervenes notches N⁴ and N³ and between which and the upper edge of slot 157 the handle 156 just about fits. The shaft 154 and the switch 149 are thus held against rocking, and the container G may be removed from the lever rest 137 without causing the resultant overbalance to cause a restarting of the apparatus. As soon as an empty container G is put back on the rest 137, the lever 155 need only be slid to the right and into juxtaposition to the notch N⁴, whence the effect of the weight 177 is sufficient to rotate the shaft 154 and switch 149 to motor-starting position, handle 156 riding into the notch N⁴ or being also manually depressed into the notch N⁴.

If desired, the balance mechanism comprising the lever 174 and related parts may be mechanically disconnected from the switch mechanism, and for this purpose the upper end of the link 183 (Figs. 7 and 8) and the switch lever 181 may be provided with any suitable disconnectible connection, such as that shown, and this may comprise simply a horizontal pin at the upper end of the link 183 removably receivable in a horizontal hole in the switch lever 181; such disconnection may be desirable where full automatic and selective control or manual control, as above described, is to be used, as by the selective positioning or actuation of the handle 156. On the other hand, and though the handle 156 may be positioned to coact with the notch N⁴ when the balance mechanism is to be employed as above described, it may be desirable to halt the step-by-step rotary movements of the cams and cam shaft, and this may be effected by manually swinging the pawl 167 (Fig. 9) which coacts with the ratchet teeth under the effect of its own weight when it is positioned to the right of its pivoting pin, over to the other side of its pivoting pin and hence in counter-clockwise direction, so that it simply hangs down to the left of the ratchet wheel 164 and is by its own weight thus held out of coacting relation with the pawl.

As above described, the shelf member 85 with the ejector 135 is detachably secured to the shaft 86 so they may be readily detached therefrom for cleaning purposes. The sub-unit 67 that carries the piercing elements 74 and tubes 73, is also mounted for ready detachment. For this purpose the upper portion of the left-hand end wall 23 (Figs. 1 and 3) terminates in a flange 189 that is U-shaped, the upwardly-extended parallel arm portions 189ᵃ and 189ᵇ of which are better shown in Fig. 5. The bottom and sides of the thickened wall 71 are also given a U-shape and throughout this "U" is a correspondingly-shaped slot, the bottom curved portion of which can snugly receive the bottom curved portion of the flange 189 and the vertically-extending parallel slot portions 71ᵃ and 71ᵇ of which (Fig. 5), respectively, receive the vertical flange portions 189ᵃ and 189ᵇ. The sub-unit 67 from the position shown in Fig. 1, may thus be slid or moved upwardly to disengage its U-shaped slot from the U-shaped flange, the parallel vertical portions of each forming guiding ways for such vertical movement, and a casing section 190 (Fig. 1), comprising a curved outer wall 191 and opposed sector-shaped side walls 192, being first detached from the frame with which it interfits in any suitable way, as by appropriately flanged junctions with the various walls or parts of the box-like frame or casing of the apparatus. It is also through the space thus cleared by the removal of the casing section 190 that the shelf part 85 with the ejector is passed when it is removed, and the detachable connection of the shelf part 85 with the shaft 86 will be seen to be such that upward vertical movement effects detachment, so that the sub-unit 67, together with the shelf part 85 and its ejector 135, may be removed as a single entity by such upward movement.

The disconnectible flange and slot connection of the sub-unit 67 relative to the base or frame of the apparatus will also be seen to be well adapted to withstand the thrusts exerted during the application of pressure to the fruit. In this connection it may also be backed up by any suitable interfitting with the walls of the cylindrical casing extension 78 that houses the spring 77 and which is preferably integrally formed in any suitable way with the upper portion of the end casing wall 23, and hence also with the U-shaped flange 189. The limited expansion allowed the spring 77 by the parts 82—83—81 holds the end plate 81 in a position where it does not interfere with the up and down movements of the sub-unit 67 as it is removed or replaced. When the latter is replaced, it is locked against upward movement by the reinsertion of the casing section 190, the curved wall 191 of which has upper and lower grooved or recessed edges, as at 191ᵃ and 191ᵇ, that interfit, respectively, with the upper part of the apparatus frame or casing and the upper edge of the walls of the sub-unit 67, as is better shown in Fig. 1, thus dependably buttressing the sub-unit 67 against upward movement.

With the sub-unit 67 removed, the spring unit within the casing extension 78 may also be removed for cleaning or adjustment, and easily replaced.

It will thus be seen that there has been provided in this invention a method and apparatus in which the various objects above noted, together with many thoroughly practical advantages, are successfully achieved.

As many possible embodiments may be made of the mechanical features of the above invention and as the art herein described might be varied in various parts, all without departing from the scope of the invention, it is to be understood that all matter hereinabove set forth or shown in the accompanying drawings is to be interpreted as illustrative and not in a limiting sense.

I claim:

1. An apparatus for extracting juice from fruit comprising a magazine for fruit, two relatively movable means between which a fruit may be subjected to compression, one of said means comprising tube means adapted to enter through the skin of the fruit and piercing means slidable relative to and within said tube means, ejecting means engageable with a compressed fruit and having means movably mounting it in a direction to remove the fruit from the region of said tube means and piercing means, a transfer mechanism for transferring fruit one by one from said magazine to said first-mentioned two means, and mechanism for effecting relative approaching and separating movement between said two means and for controlling projecting and retrograde movement of said piercing means relative to said tube means, means synchronized with said last-mentioned mechanism for actuating said transfer mechanism to transfer a fruit when said piercing means project from said tube means thereby to effect piercing of the fruit skin on one side of the fruit upon relative approaching movement between said two means and for thereafter effecting retrograde movement of said piercing means to avoid piercing the skin on the other side of the fruit, said tube means and piercing means having channel means for conveying juice therethrough from the inside of the fruit during compression of the latter and means synchronized with said second-mentioned mechanism for effecting projecting movement of said piercing means and actuation of said ejecting means to remove the fruit remnant from the tube means and piercing means upon relative separating movement between said two means.

2. An apparatus as claimed in claim 1 in which the means that has said tube means and piercing means comprises a barrier wall through which said tube means extends and from at least one face of which said tube means projects for entry through the hole in the skin pierced by the piercing means, and means at the other face of said wall for receiving juice discharged through said channel means.

3. An apparatus as claimed in claim 1 in which the means that has said tube means and piercing means comprises a barrier wall through which said tube means extends and from at least one face of which said tube means projects for entry through the hole in the skin pierced by the piercing means, and means at the other face of said wall for receiving juice discharged through said channel means, said receiving means comprising a container and means responsive to the reception therein of a quantity of juice for controlling operation of the apparatus in repeated cycles.

4. An apparatus as claimed in claim 1 provided with driving means adapted to actuate said mechanisms in repeated cycles, and selectively controllable means for controlling said driving means in individual cycles and in selectable cyclic repetitions.

5. An apparatus as claimed in claim 1 in which the mechanism for controlling the projecting and retrograde movement of said piercing means relative to said tube means comprises means for holding said piercing means against retrograde movement during a first operation of approaching movement between said first-mentioned two means to thereby pierce the skin of the fruit on one side thereof and to effect entry of the tube means through the pierced hole, and means for thereafter and during the succeeding operation of approaching movement between said two means giving said piercing means a retrograde movement to prevent it from piercing the skin on the other side of the fruit.

6. An apparatus as claimed in claim 1 in which the mechanism for controlling the projecting and retrograde movement of said piercing means relative to said tube means comprises spring means for holding said piercing means in projected position to thereby pierce and enter through the skin on one side of the fruit, and means operating at an intermediate point in the stroke of said relative approaching movement to give said piercing means a retrograde movement against the action of said spring means at a rate to prevent said piercing means from internally piercing the skin of the fruit on the other side thereof.

7. An apparatus as claimed in claim 1 in which the mechanism for controlling the projecting and retrograde movement of said piercing means relative to said tube means comprises spring means for yieldably holding said piercing means in projected position relative to said tube means, and means engageable in response to continued relative approaching movement between said first-mentioned two means to oppose said spring means and in response to said continued relative movement to give said piercing means retrograde movement in opposition to said spring means.

8. An apparatus for extracting juice from fruit comprising a concave member and an opposed member having means mounting them for relative approaching and separating movement, said concave member having projecting therefrom passage-bearing means adapted to pierce the skin at the adjacent side of a fruit pressed thereagainst upon relative approaching movement between said two members, means for effecting relative approaching movement between said two members to impale the interposed fruit upon said passage-bearing means, and means for giving said passage-bearing means retrograde movement relative to said concave member during continued compression of the interposed fruit to thereby prevent said passage-bearing means from piercing the skin on that side of the fruit that is engaged by said opposed member.

9. An apparatus for extracting juice from round fruit comprising two relatively movable elements between which a fruit may be subjected to compression, one of said elements being substantially concave and the other being substantially convex and forming therebetween a concavo-convex space during relative approaching movement, means adapted to enter through the skin of the fruit and provided with channel means extending therethrough for leading juice from the interior of the fruit, and an annular resilient member disposed between said two movable elements to extend into and substantially close the peripheral opening of said space during said relative approaching movement of said elements.

10. An apparatus for extracting juice from round fruit comprising means forming a variable concavo-convex internal chamber within which a fruit is subjected to compression and to substantial concavo-convex shape, said means including a resilient annular compression sealing member closing the outer annular boundary of said chamber, and means for passing juice from the interior of a fruit within said chamber to the exterior of the latter.

11. An apparatus for extracting juice from fruit comprising a concave member and a convex member having means mounting them for relative approaching and separating movement, one of said members having projecting therefrom passage-bearing means adapted to pierce the skin at the adjacent side of a fruit pressed thereagainst upon relative approaching movement between said two members, an annulus of yieldable material adapted to substantially enter and close off the annular gap formed between said two members, and means for effecting relative approaching and separating movement between said two members and for subjecting said yieldable annulus to compression in said annular gap.

12. An apparatus for extracting juice from fruit comprising a concave member and a convex member having means mounting them for relative approaching and separating movement, one of said members having projecting therefrom passage-bearing means adapted to pierce the skin at the adjacent side of the fruit pressed thereagainst upon relative approaching movement between said two members, means for effecting relative approaching and separating movement between said two members to effect compression and distortion of the fruit therebetween during relative approaching movement, and annular means in the annular gap between said two members for substantially enclosing the annular portion of the fruit undergoing compression and distortion that is exposed to said gap, said annular means comprising a part made of resilient material and thereby adapted to conform itself to the configuration of the exposed annular portion of the fruit.

13. An apparatus as claimed in claim 12 in which said annular means comprises a member of yieldable material, and means operating during at least a portion of the relative approaching movement between said two members to subject said yieldable member to pressure and thereby press it against the exposed annular portion of the fruit.

14. An apparatus as claimed in claim 12 in which said annular means comprises a member of resilient material extending about at least a portion of said convex member, and means supporting it from said convex member.

15. An apparatus for extracting juice from fruit comprising a downwardly sloping support having tube means projecting therefrom and piercing means extending through said tube means, said tube and piercing means providing channel means for the passage of liquid therethrough, and means for effecting relative movement between a fruit and said support to first effect piercing of the skin of the fruit by said piercing means and then to effect entry of the tube means through the skin of the fruit, said downwardly sloping support permitting discharge therefrom of possible extracts from the skin of said fruit.

16. An apparatus as claimed in claim 15 in which said tube means and piercing means have respective internal and external configurations to provide said channel means therebetween.

17. An apparatus as claimed in claim 15 in which said channel means is provided by an internal bore extending along said piercing means.

18. An apparatus as claimed in claim 15 in which said channel means is provided by an internal bore extending along said piercing means, said piercing means having a plurality of side openings leading to said bore.

19. An apparatus as claimed in claim 15 in which said channel means is provided by an internal bore extending along said piercing means, said piercing means having slot means extending lengthwise thereof and forming lateral communication to said bore, said bore terminating short of the forward end of said piercing means thereby to form a substantially solid terminus and said slot means having forward extensions exposed laterally of said solid terminus.

20. A citrus fruit juice extractor comprising, in combination, a first fruit engaging element having a first fruit engaging wall, a frame supporting said element with said wall sloping downwardly toward one edge of said wall, thereby to permit drainage of oily extracts from the skin of said fruit along said wall to the lower edge thereof, said wall having a plurality of apertures therein, a tube aligned with each of said apertures secured to said wall and projecting out from said wall to enter through the skin of a citrus fruit pressed against said wall, a piercing prong longitudinally slidable in each of said tubes, the assembly of each of said piercing prongs and its associated tube being formed to provide at least one longitudinal passage for juice from the inside of a fruit pressed against said wall through said apertures to the rear of said wall, a second fruit engaging element having a second fruit engaging wall and a support for said second element movable relative to said first element to move said second wall to a fruit pressing position adjacent and substantially parallel to said first wall thereby to press a fruit onto said prongs and tubes and compress said fruit to express the juice therefrom through said passages to the rear of said first wall.

21. A citrus fruit juice extractor as claimed in claim 20, wherein said first fruit engaging wall is concave and said second fruit engaging wall is convex so as to be substantially complementary to said concave wall.

22. A citrus fruit juice extractor as claimed in claim 20, in which said prongs and tubes are substantially parallel to the direction of relative approach of said fruit engaging walls.

23. A citrus fruit juice extractor as claimed in claim 20, wherein a yieldable annular wall is disposed around the periphery of one of said fruit engaging walls to substantially enclose said fruit during compression thereof.

24. A citrus fruit juice extractor as claimed in claim 20, wherein a spring is interposed between said frame and the rear ends of said prongs to yieldably hold said prongs in extended position.

25. A citrus fruit juice extractor as claimed in claim 20, wherein a shelf is disposed below said first fruit engaging wall to support said fruit prior to compression thereof, said shelf being tiltable to permit the fruit remnant to fall after retraction of said fruit engaging walls.

26. A citrus fruit juice extractor as claimed in claim 25, in which a fruit ejector is secured to said shelf to lie against said first fruit engaging wall when said shelf is in fruit supporting position and to rotate outwardly from said wall to eject the fruit remnant responsive to tilting of said shelf.

FRANCISCO ANGEL QUIROZ.

REFERENCES CITED

The following references are of record in the file of this patent:

UNITED STATES PATENTS

| Number | Name | Date |
|---|---|---|
| 160,697 | Newberger | Mar. 9, 1875 |
| 620,047 | Neal | Feb. 21, 1899 |
| 1,264,080 | Jennings | Apr. 23, 1918 |
| 1,888,528 | Faulds | Nov. 22, 1932 |
| 1,925,196 | Maull | Sept. 5, 1933 |
| 1,944,904 | Read | Jan. 30, 1934 |
| 1,960,501 | Maull | May 29, 1934 |
| 2,174,909 | McCulloch | Oct. 3, 1939 |
| 2,346,561 | Delay | Apr. 11, 1944 |
| 2,363,798 | McCulloch | Nov. 28, 1944 |
| 2,369,305 | Lobasso | Feb. 13, 1945 |
| 2,420,679 | Pipkin | May 20, 1947 |
| 2,454,256 | Myers | Nov. 16, 1948 |

FOREIGN PATENTS

| Number | Country | Date |
|---|---|---|
| 399,761 | Great Britain | Oct. 12, 1933 |
| 774,454 | France | Sept. 24, 1934 |